Patented Nov. 7, 1933

1,933,962

UNITED STATES PATENT OFFICE 1,933,962

PRESERVING OF RUBBER

Max Bögemann, Cologne-Mulheim, Curt Kreuter, Cologne-Nippes, and Theodor Weigel, Cologne-Mulheim, Germany, assignors to I. G. Farbenindustrie Aktiengesellschaft, Frankfort-on-the-Main, Germany No Drawing. Application December 31, 1931, Serial No. 584,282, and in Germany December 31, 1930

12 Claims.  (Cl. 18—50)

The present invention relates to a process of preserving rubber against deterioration due to age.

In accordance with the invention rubber is preserved against deterioration due to age by incorporating therewith a compound of the general formula:—

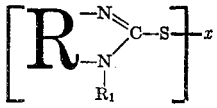

wherein $x$ means hydrogen or the grouping put into parenthesis in the above formula, R means an arylene radical, $R_1$ means hydrogen or a hydrocarbon radical, such as alkyl, aryl, aralkyl etc. R and/or $R_1$ may be substituted by monovalent substituents, more particularly by alkyl groups, such as methyl, ethyl, propyl, butyl etc. or by alkoxy groups, such as methoxy-, ethoxy-, propyloxy groups etc. It may be mentioned that in case $x$ means hydrogen in the above formula, the compounds in question may also possess the tautomeric formula:—

This tautomeric form of the compounds is intended to be included into the formula given above.

The incorporation of our antiperishing agents within the rubber may be performed in various ways, for example, by mechanically mixing the said agents with rubber, by rolling or kneading or by treating rubber or rubber vulcanizates with a solution of the antiperishing agents in a suitable organic solvent, such as alcohol, benzene or the like. By the incorporation of the antiperishing agents within rubber as well the unvulcanized rubber as the corresponding vulcanizates are protected from deterioration due to age to a far reaching extent.

The term "rubber" as used herein is intended to embrace natural rubber and artificial rubber-like masses as are obtainable by polymerizing a butadiene hydrocarbon (butadiene, isoprene, 2.3-dimethylbutadiene etc.) or another compound capable of forming rubber-like polymerizates according to any desired method, for example, by heating or by means of an alkali metal (sodium metal, for example) or while in emulsion with water and an emulsifying agent.

After the incorporation of the antiperishing agents the rubber may be vulcanized according to the usual methods. For example, sulfur or another vulcanizing agent, such as selenium, aromatic nitro compounds and metal oxides, a vulcanization accelerator and, if desired, plasticizing agents and/or filling materials may be incorporated within the rubber together with or apart from the antiperishing agents defined above. The vulcanization mixture thus obtained is then heated to temperatures usually applied in vulcanization processes, for example, to about 100–150° C.

It is an advantage of our antiperishing agents that they do not discolor the vulcanizates to any noteworthy degree, that they do not lend any unpleasant smell to the latter and that the vulcanizates containing the same do not change color when exposed to light. Furthermore, our antiperishing agents do not influence the vulcanization process to a substantial degree, it means, they neither accelerate nor retard vulcanization. This is all the more surprising, since compounds of similar structure, such as

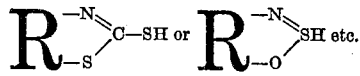

wherein R means an arylene group, are strong vulcanization accelerators.

The antiperishing agents, which are within the scope of the present invention can be obtained, for example, by reacting with carbon bisulfide upon ortho-arylenediamines, naphthalene-peridiamines or also ortho-semidines as described in Gazetta Chimica Italiana vol. 23, page 295, Annalen der Chemie, vol. 365, page 141 or vol. 287, page 133 and in several publications in Berichte der deutschen Chemischen Gesellschaft (see below).

The following table shows some of the compounds, which have been tested and found to be valuable antiperishing agents:

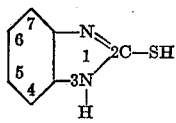

2-mercaptobenzimidazol (Gazetta Chimica Italiana vol. 23, page 295)

6-ethyl-2-mercaptobenzimidazol 6-propyl-2-mercaptobenzimidazol 3-phenyl-2-mercaptobenzimidazol obtainable from 2-amino-diphenylamine and carbon disulfide (melting point 194–195°)

3.6-dimethyl-2-mercaptobenzimidazol (Berichte der deutschen Chem. Ges. vol. 26, page 196)

3-ethyl-6-methyl-2-mercaptobenzimidazol (Berichte der deutschen Chem. Ges. vol. 26, page 200)

3-paratolyl-6-methyl-2-mercaptobenzimidazol (Berichte der deutschen Chem. Ges., vol. 23, page 3799)

5-methoxy-2-mercaptobenzimidazol 3-phenyl-5-ethoxy-7-methyl-2-mercaptobenzimidazol (Berichte d. dtsch. Chem. Ges. vol. 36, page 3852)

3-phenyl-5-ethoxy-2-mercaptobenzimidazol (Berichte d. dtsch. Chem. Ges. vol. 25, page 1001)

2-mercaptonaphthimidazol 2-mercaptoperimidine (Annalen, vol. 365, page 141) etc.

As outlined above all the compounds in question may also be applied in the tautomeric form. Furthermore, the disulfides obtainable by oxidizing the above compounds, for example, with hydrogen peroxide, have been tested and found to be likewise valuable antiperishing agents. These disulfides correspond to the general formula

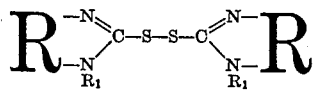

wherein R and $R_1$ are to be explained as mentioned for the first formula on page 1.

The following examples illustrate the invention, without, however, restricting it thereto, the parts being by weight:—

*Example 1*

A vulcanization mixture was prepared from:—
  100.0 parts of light crepe
  50.0 parts of lithopone
  5.0 parts of zinc oxide
  3.6 parts of sulfur
  1.1 parts of hexamethylentetramine
  0.5 parts of stearic acid
  1.5 parts of mercaptobenzimidazol.

This mixture was vulcanized for 45 minutes at 3½ atmospheres steam pressure (superatmospheric). Comparative ageing tests were made with the vulcanizate thus obtained and with a vulcanizate obtained in the same manner but in the absence of mercaptobenzimidazol. The ageing tests were performed by heating the respective vulcanizates in a Geer oven to 70° C. Two days of heating in this oven correspond to a natural ageing of one year.

The following figures were obtained:—

| Ageing | Tensile strength in kg/cm² | |
|---|---|---|
| | Without antiperishing agent | With the addition of mercaptobenzimidazol |
| Prior to the ageing test | 202 | 206 |
| Heated for 6 days to 70° C | 165 | 179 |
| Heated for 12 days to 70° C | 113 | 145 |
| Heated for 18 days to 70° C | 85 | 124 |

*Example 2*

A vulcanization mixture was prepared from:
  100.0 parts of light crepe
  30.0 parts of blanc fixe
  10.0 parts of zinc oxide
  3.0 parts of sulfur
  0.8 parts of mercaptobenzothiazol
  1.0 parts of ozokerite
  1.6 parts of stearic acid
  1.5 parts of antiperishing agent.

As antiperishing agents were applied:—
  (a) Mercaptobenzimidazol,
  (b) Benzimidazyl disulfide.

| Ageing | Tensile strength in kg/cm² | | |
|---|---|---|---|
| | Without antiperishing agent | With the addition of | |
| | | a | b |
| Prior to the ageing test | 192 | 162 | 186 |
| Heated for 6 days to 70° C | 158 | 192 | 185 |
| Heated for 12 days to 70° C | 146 | 167 | 182 |
| Heated for 18 days to 70° C | 109 | 166 | 160 |

The ageing tests were performed as described in Example 1, after vulcanizing the mixture for 30 minutes at 3½ atmospheres (superatmospheric).

Example 3

A vulcanization mixture was prepared from:—
- 100.0 parts of light crepe
- 10.0 parts of blanc fixe
- 10.0 parts of lithopone
- 5.0 parts of zinc oxide
- 2.7 parts of sulfur
- 0.27 parts of tetramethylthiuramdisulfide
- 1.0 parts of stearic acid
- 1.5 parts of antiperishing agent.

As antiperishing agents were applied:—
(a) Mercaptobenzimidazol
(b) Benzimidazyl disulfide.

The mixture was vulcanized for 25 minutes at 3½ atmospheres (superatmospheric) and the ageing tests were performed as described in Example 1.

| Ageing | Tensile strength in kg/cm² | | |
|---|---|---|---|
| | Without antiperishing agent | With the addition of | |
| | | a | b |
| Prior to the ageing test | 229 | 228 | 239 |
| Heated for 6 days to 70° C | 107 | 192 | 137 |
| Heated for 12 days to 70° C | 35 | 130 | 71 |
| Heated for 18 days to 70° C | 16 | 107 | 36 |

Example 4

A vulcanization mixture was prepared from:—
- 100.0 parts of light crepe
- 50.0 parts of lithopone
- 5.0 parts of zinc oxide
- 3.6 parts of sulfur
- 1.1 parts of hexamethylenetetramine
- 0.5 parts of stearic acid
- 1.5 parts of mercaptoperimidine This mixture was vulcanized for 45 minutes at 3½ atmospheres (superatmospheric) and the ageing tests were performed as described in Example 1.

| Ageing | Tensile strength in kg/cm² | |
|---|---|---|
| | Without antiperishing agent | With the addition of mercaptoperimidine |
| Prior to the ageing test | 183 | 195 |
| Heated for 6 days to 70° C | 168 | 177 |
| Heated for 12 days to 70° C | 90 | 160 |
| Heated for 18 days to 70° C | 66 | 156 |

Similar results are obtained when substituting in the above examples the natural rubber by artificial rubber-like masses as outlined above.

We claim:—

1. The process which comprises incorporating within rubber a vulcanizing agent and a compound of the probable general formula:—

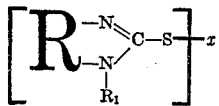

wherein $x$ means hydrogen or the grouping put into parenthesis in the above formula, R means an arylene radical and $R_1$ hydrogen or a hydrocarbon radical and wherein R and $R_1$ may be substituted by alkyl- or alkoxy groups and vulcanizing the mixture.

2. The process which comprises incorporating within rubber a vulcanizing agent and a compound of the probable general formula

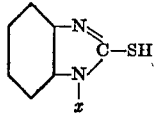

wherein the benzene ring may be substituted by alkyl groups and $x$ means hydrogen or alkyl and vulcanizing the mixture.

3. The process which comprises incorporating within rubber a vulcanizing agent and a compound of the probable formula:

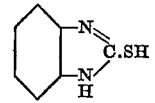

and vulcanizing the mixture.

4. The process which comprises incorporating within rubber a vulcanizing agent and a compound of the probable formula:—

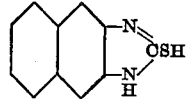

and vulcanizing the mixture.

5. The process which comprises incorporating within rubber sulfur and a compound of the probable general formula:—

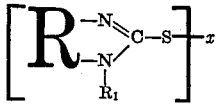

wherein $x$ means hydrogen or the grouping put into parenthesis in the above formula, R means an arylene radical and $R_1$ hydrogen or a hydrocarbon radical and wherein R and $R_1$ may be substituted by alkyl- or alkoxy groups, and vulcanizing the mixture.

6. The process which comprises incorporating within rubber sulfur and a compound of the probable general formula:—

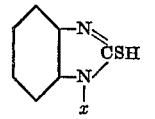

wherein the benzene ring may be substituted by alkyl groups and $x$ means hydrogen or alkyl, and vulcanizing the mixture.

7. The process which comprises incorporating within natural rubber sulfur and a compound of the probable formula:—

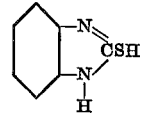

and vulcanizing the mixture.

8. The process which comprises incorporating within natural rubber sulfur and a compound of the probable formula:—

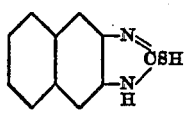

and vulcanizing the mixture.

9. Composition of matter comprising rubber and a compound of the probable general formula:—

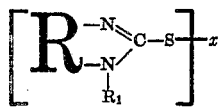

wherein $x$ means hydrogen or the grouping put into parenthesis in the above formula, R means an arylene radical and $R_1$ hydrogen or a hydrocarbon radical and wherein R and $R_1$ may be substituted by alkyl- or alkoxy groups.

10. Composition of matter comprising rubber and a compound of the probable general formula:—

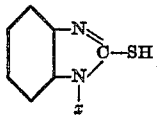

wherein the benzene ring may be substituted by alkyl groups and $x$ means hydrogen or alkyl.

11. Composition of matter comprising rubber and a compound of the probable formula:—

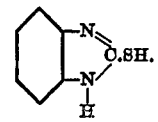

12. Composition of matter comprising rubber and a compound of the probable formula:—

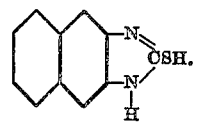

MAX BÖGEMANN.
CURT KREUTER.
THEODOR WEIGEL.